United States Patent [19]

Tabata

[11] 4,253,122
[45] Feb. 24, 1981

[54] AUTOMATIC ADJUSTMENT OF BIASING CURRENT FOR RECORDING SOUND BY THREE-HEAD TYPE TAPE-RECORDER

[75] Inventor: Hiromu Tabata, Kyoto, Japan

[73] Assignee: Onkyo Kabushiki Kaisha, Osaka, Japan

[21] Appl. No.: 39,916

[22] Filed: May 17, 1979

[30] Foreign Application Priority Data

May 30, 1978 [JP] Japan ................................ 53-65379

[51] Int. Cl.³ .............................................. G11B 5/47
[52] U.S. Cl. ........................................ 360/66; 360/31
[58] Field of Search ................................. 360/66, 31

[56] References Cited

U.S. PATENT DOCUMENTS

| 2,791,640 | 5/1957 | Wolfe | 360/31 |
| 4,011,585 | 3/1977 | Sunaga | 360/66 |
| 4,038,692 | 7/1977 | Umeda et al. | 360/66 |
| 4,092,678 | 5/1978 | Nishikawa | 360/66 |

*Primary Examiner*—Vincent P. Canney
*Attorney, Agent, or Firm*—Edwin E. Greigg

[57] ABSTRACT

A method and an apparatus for automatically establishing proper adjustment of recording bias current to obtain a flat reproduction frequency characteristic with a three-head type taperecorder in which sound recorded by a recorder head on a running magnetic tape may be immediately reproduced by a reproducer head immediately downstream of the recorder head.

In the method and the apparatus, a composite calibration signal is generated by mixing a lower frequency signal and a higher frequency signal having the same level, the composite calibration signal is then recorded on a running tape while chronologically consecutively altering intensity of the recording bias current, immediately thereafter the recorded composite calibration signal is reproduced from the running tape and filtered off to obtain component lower and higher frequency signal outputs, subsequently the output sound levels of the filtered lower and higher frequency signals are compared, and finally the alteration of the recording bias current intensity is stopped when the output sound levels of the filtered lower and higher frequency signals have become substantially identical with each other.

6 Claims, 7 Drawing Figures

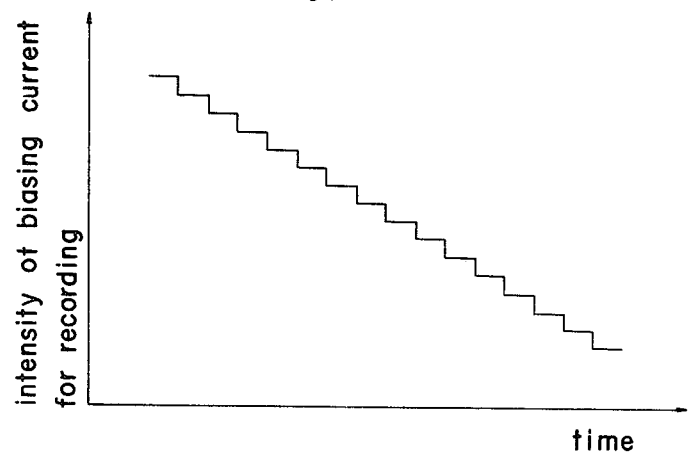
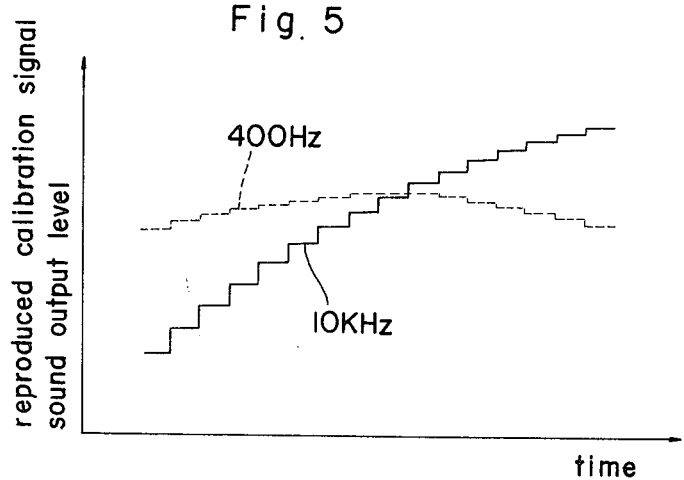

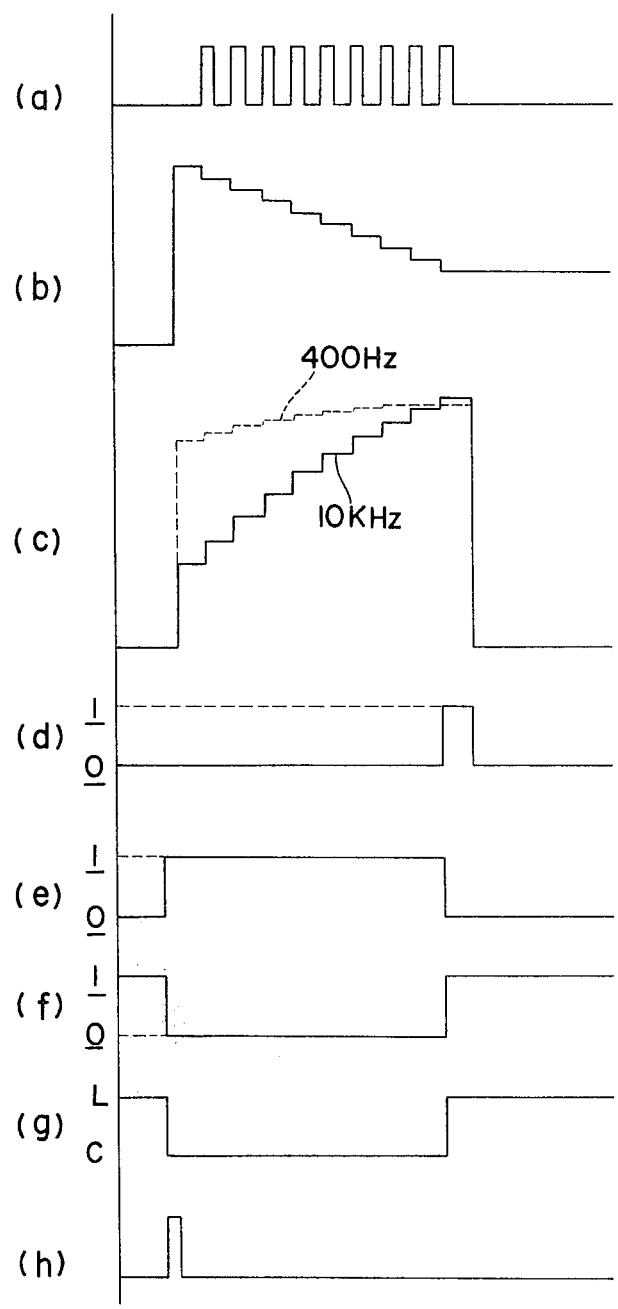

AUTOMATIC ADJUSTMENT OF BIASING CURRENT FOR RECORDING SOUND BY THREE-HEAD TYPE TAPE-RECORDER

BACKGROUND OF THE INVENTION

This invention relates to a method and an apparatus therefor of automatic adjustment of biasing current for recording sound by three-head type tape-recorder which has a recorder head and a reproducer head as well as an eraser head, one separate from and independent of another, so that recording sound by the recorder head on a running magnetic tape and immediately reproducing the recorded sound by the reproducer head immediately downstream of the recorder head in the sense of the tape-running may be made.

In this field of art, it is a conventionally established knowledge that the reproduced sound output level shows variation in accordance with variation in the intensity of the biasing current for the recording, and that correlation between these two variations differs as a function of the frequency of the recorded sound, as diagramatically shown in FIG. 1 of the accompanying drawings, which is a chart with the magnetic tape recording bias current intensity on abscissa and the reproduced sound output level on ordinate, giving two typical curves with respect to the sounds of 400 Hz and 10 kHz, respectively.

As is apparent, ratio of the reproduced sound output level variation to the recording bias current intensity variation is smaller in the case of comparatively low frequency sound than in the case of comparatively high frequency sound.

Thus, remarkable effect of variation in the intensity of the recording bias current over the frequency characteristic chart of the reproduced sound with a given tape-recording apparatus is seen in the higher frequency range, as illustrated in FIG. 2.

In order to realize optimal frequency characteristics with the widest flat range, it is essential to properly select the recording bias current intensity as will result in the same reproduced sound output level in the low frequency signal range (as may be represented for instance by 400 Hz) as in the higher frequency signal range (as may be represented for instance by 10 kHz). Such optimal biasing current intensity is designated in FIGS. 1 and 2 at $P_o$.

Said chart of correlation between the recording bias current intensity and the reproduced sound level also differs or deflects considerably as the magnetic characteristics of the recording tape material differ, and it is also in the higher frequency range that such deflection of the characteristics is prominent.

For instance, FIG. 3 illustrates the comparison of the characteristic curves, similar to those shown in FIG. 1, thus for 400 Hz and 10 kHz, with respect to the tape using $CrO_2$ as the magnetic material (shown in solid lines) and the tape generally referred to as "normal", using $\gamma$-$Fe_2O_3$ (in broken lines), and it is thus apparent that the said optimal biasing current intensity $P_o'$ in the case of $CrO_2$, to give the same reproduced sound output level both for 400 Hz and 10 kHz, is larger than the intensity $P_o$ of the same optimal nature in the case of $\gamma$-$Fe_2O_3$. In other words, the former material $CrO_2$ requires stronger recording bias current for realizing the ideal sound reproduction frequency characteristics, with the widest flat range, than does the latter material $\gamma$-$Fe_2O_3$.

It is essential, therefore, to select the optimal recording bias current intensity in proper accordance with the magnetic characteristics of the particular tape material actually in use, for realizing said ideal sound reproduction frequency characteristics with the widest flat range, and in view that one must foresee to use various kinds of tapes, of the materials with magnetic characteristics different from one to another (for instance $CrO_2$, FeCr, $\gamma$-$Fe_2O_3$ and so forth), in tape-recorders, especially those of casette-type, there have by now been in use those wherein the recording bias current is adjustable or variable in accordance with the kind of the magnetic tape actually used.

For instance, there have been tape-recorders with such circuitry for adjusting the recording bias current as may switch over the current intensity in a few pre-set steps or as may effect further precise readjustment by means of continuously manipulating a variable resistor after first selectively switching over the current also in a few steps, in accordance with the kind of the magnetic tape actually used.

As is apparent, it is not possible with the tape-recorders having the circuitry as described above, to always set the truly optimal recording bias current intensity for all the magnetic tapes with the magnetic characteristics different from one to another in a quite wide range, since the bias current intensity can only be switched over in a few steps or at best can further precisely be readjusted near each of said a few steps, and still more the mode of such manipulation as is required for actually manually adjusting the recording bias current intensity is very troublesome and time-consuming, even leading to the fear of failing at all to realize the optimal adjustment of the recording bias current, from erroneous switching operation or accidental improper manipulation, as may be apt to occur.

SUMMARY OF THE INVENTION

This invention is made to eliminate the drawbacks of the conventional techniques as outlined hereinabove, and has therefore as its object to provide a method and an apparatus thereof of automatic adjustment of recording bias current intensity, as can automatically, accurately and rapidly realize optimal recording bias current intensity always in proper accordance with the specific magnetic tape actually used for the recording, thus perfectly no matter what kind of the tape is actually used.

In order to attain the object, the method of automatically establishing proper adjustment of biasing current for recording sound with a three-head type tape-recorder comprises according to this invention the steps of: generating composite calibration signals by mixing a lower frequency signal and a higher frequency signal, having sound levels identical with each other; recording the composite calibration signal on a running tape while chronologically consecutively altering intensity of biasing current for the recording; immediately reproducing the recorded composite calibration signal on the running tape; filtering off the reproduced composite calibration signal to obtain the component lower and higher frequency signal outputs; comparing output sound levels of the filtered lower and higher frequency signals with each other; and stopping any further altering the recording bias current intensity upon finding, as a result of the comparing, that the output sound levels of the filtered lower and higher frequency signals have become substantially identical with each other or that the output sound level difference has just been substantially reversed, namely that the output sound level of the one component signal, initially having lower output sound level than the other, has just become substantially higher than that of the other.

An apparatus constructed in accordance with this invention for practicing the method described above comprises: a pulse generator adapted to generate successive pulses during the running of the magnetic tape; a counter circuit adapted to consecutively count up number of the pulses; a D/A convertor adapted to receive as input therefor the pulse number digital output and to give as output thereof stepwise voltage woth the consecutive stepwise output voltage variations in response to the consecutive counting up of the pulses; a buffer amplifier adapted to amplify the stepwise voltage; a bias generator adapted to receive as input therefor th amplified stepwise voltage and to give as output thereof the recording bias current of the intensity chronologically consecutively altered stepwise responsive to the amplified stepwise input voltage; a mixer circuit adapted to generate composite calibration signals by mixing a lower frequency signal and a higher frequency signal, both of the signals having sound levels identical with each other; a parallelly interconnected pair of a high pass filter and a low pass filter adapted to separate, into the component lower and higher frequency signal outputs, the composite calibration signal as reproduced by the reproducer head immediately after being recorded by the recorder head on the running magnetic tape; a pair of separate, independent rectifier circuits adapted to rectify the signal outputs of the filters, respectively; a voltage comparator circuit adapted to receive as input therefor and compare with each other the rectified output voltages of the rectifier circuits and to give as output thereof a pulse signal upon finding, as a result of the comparing, that the rectified voltages have become substantially identical with each other or that the rectified voltage difference has just been substantially reversed, namely that the rectified voltage of the output of one filter, initially smaller than that of the other, has become substantially larger than that of the other; a RS flip-flop circuit with two outputs which are inverse to each other with respect to their high and low level states and which are adapted to be switched as triggered by the pulse output signal of the voltage comparator; an AND-gate adapted to pass forward, an input to the counter circuit, and to block up, the successive pulses of the generator depending upon the high and low level states, respectively, of one output of the flip-flop circuit; a recording-input-switcher circuit adapted to be switched between two conduction states, namely to sound signal line terminal contact and to calibration terminal contact, depending upon the high and low level states, respectively, of the other output of the flip-flop circuit; and a starting-pulse-input terminal adapted to receive, at the beginning of the recording, a starting pulse to reset both the counter circuit and the RS flip-flop circuit to their initial states.

Thus, when the lower frequency signal and higher frequency signal having the sound level identical with each other and forming up the composite calibration signal are simultaneously recorded on a running tape and immediately reproduced from the tape, while chronologically consecutively altering intensity of biasing current for the recording in stepwise manner for instance as illustrated in FIG. 4, then the reproduced calibration signal sound output levels will show accordingly the chronological stepwise alterations in this instance as respectively illustrated in FIG. 5. It is apparent, therefore, that the optical recording bias current intensity for obtaining sound reproduction frequency characteristics with the widest flat range can be realized by stopping, in the process of such chronological consecutive stepwise alteration, any further altering the recording bias current intensity upon finding that the reproduced output sound levels of the lower and the higher frequency signals have become identical with each other or as in the illustrated instance that the reproduced output sound level of the higher frequency signal has just exceeded that of the lower frequency signal, thus reversing the polarity relation from the initial state.

With the method and the apparatus therefor according to this invention as described hereinabove, the optimal recording bias current is realized always automatically, accurately and rapidly, no matter what kind of the magnetic tape is actually used for the recording, requiring no further manual operation than only setting the tape-recorder in the recording mode. Manipulation for realizing the adjustment is thus made quite simple in comparison with the conventional techniques where the adjustment of the recording bias current has every time manually been made in accordance with magnetic characteristics of the magnetic tape actually used for the recording, thereby eradicating any error as might conventionally enter as a result of such manual operation.

Apart from such benefit of the quite simplified operation, it is also an advantage of prominent practical value that the optimal recording bias current is realized, as already mentioned above, according to this invention, always in proper response to the magnetic characteristics of any of the quite various magnetic tapes as may actually be selected and used for the recording, thus substantially improving and perfecting the recording and reproducing function.

Other objects and advantages of this invention will be apparent from the detailed description now to follow:

BRIEF DESCRIPTION OF THE DRAWINGS

FIG. 4 is a chart of an exemplary mode of how the recording bias current intensity is chronologically altered in practicing this invention;

FIG. 5 is a chart, according to practical recording and reproducing characteristics of the recorder, of the chronological alteration of the reproduced calibration signal sound output levels;

FIG. 7 is a timing chart with interrelated variation forms of electrical signals and conduction states appearing in various points in the block diagram of FIG. 6 in performing this invention.

DETAILED DESCRIPTION OF A PREFERRED EMBODIMENT

Figure 1:
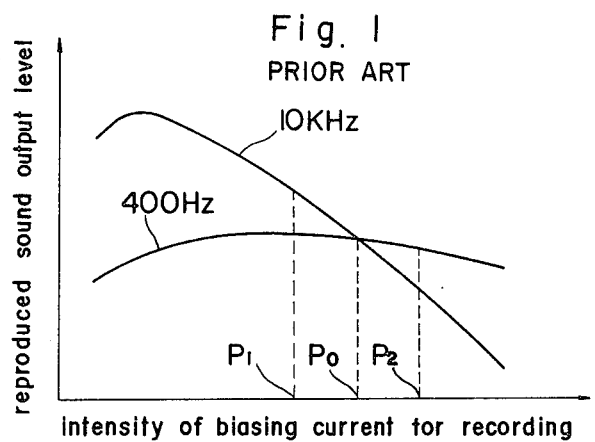
FIG. 1 is a chart showing characteristic correlation between the recording bias current intensity and the reproduced sound output level, with the curves for 400 Hz and 10 kHz.
Figure 2:
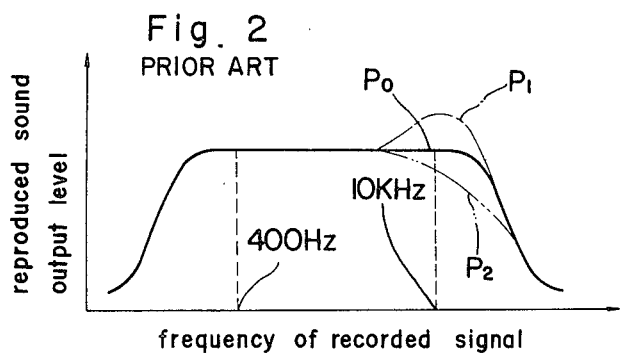
FIG. 2 is a frequency characteristic chart with respect to sound reproduction with a magnetic tape, showing how the curve is modified by altering the recording bias current intensity.
Figure 3:
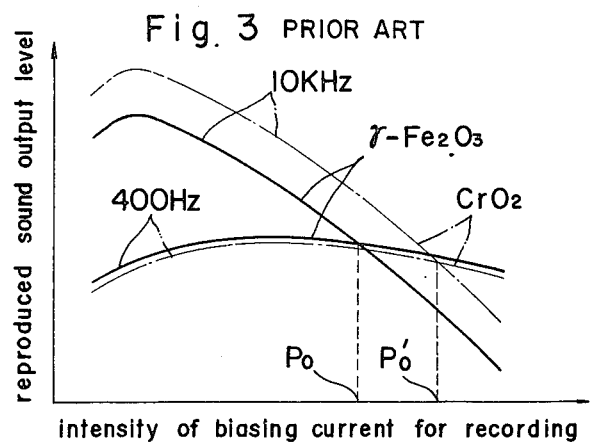
FIG. 3 is a chart similar to FIG. 1, showing how the curves differ as the different magnetic tapes are used.
Figure 6:
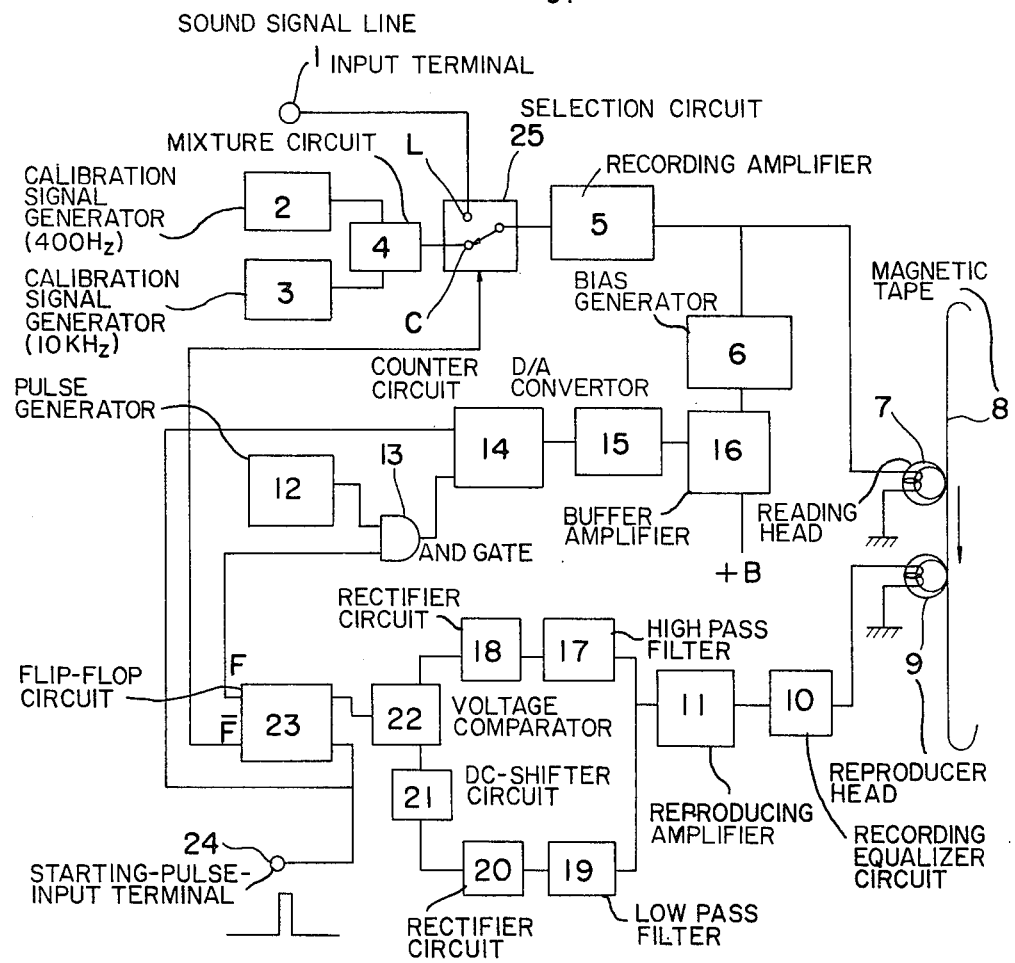
FIG. 6 is a block diagram of an embodiment of the apparatus according to this invention.

FIG. 6 shows a block diagram of an apparatus according to this invention, which is now described in more detail hereunder:

Designated in FIG. 6 at 1 is the sound signal line input terminal, 2 and 3 are calibration signal generators to give as their outputs a lower frequency signal (for instance sinusoidal wave of 400 Hz) and a higher frequency signal (for instance sinusoidal wave of 10 kHz), respectively, having sound level identical with each other, 4 is a mixer circuit to mix together the two calibration signal generator outputs thus for generating a composite calibration signal, 5 is a recording amplifier, 6 is a recording bias oscilator, 7 is a recorder head, 8 is a magnetic tape, 9 is a reproducer head, 10 is a reproducing equalizer circuit and 11 is a reproducing amplifier.

Provided further thereto in the apparatus of the illustrated instance as the components characteristic to this invention are: means for setting the tape-recorder automatically in the mode for adjusting the recording bias current intensity when the tape-recorder is manually set-in simply for the recording, means for chronologically altering the recording bias current intensity, means for comparing output reproduced sound levels of the said two component calibration signals, means for stopping any further altering the recording bias current intensity as a result of the comparing, automatically upon reaching the optimal recording bias current intensity, thus for completing the recording bias current intensity adjustment, and means for setting over the tape-recorder automatically in the mode for recording normally the sound signal line input upon the adjustment completion. More specifically describing the component parts to make up these various means, there are provided as seen in FIG. 6: a pulse negerator 12, an AND-gate 13, a counter circuit 14, a D/A convertor 15, a buffer amplifier 16, a high pass filter 17, a low pass filter 19, rectifier circuits 18 and 20, a DC-shifter circuit 21, a voltage comparator circuit 22, an RS flip-flop circuit 23, a starting-pulse-input terminal 24 and a recording-input-signal selection circuit 25. The symbol +B represents a constant power source voltage for the buffer amplifier 16.

How the apparatus functions is now described hereunder:

To start operating the apparatus, the operator has nothing manually to do than simply to push the recording button (not illustrated in any way at all) of the tape-recorder. The recorder is then set in the recording mode, and the recording-input-signal selection circuit 25 is automatically set in the state to make up conduction to calibration-terminal contact C, as actuated by the RS flip-flop circuit 23, as is described in more detail later in this specification.

As the magnetic tape 8 runs on, the pulse generator 12 generates successive pulses which pass through the AND-gate 13 and are given to the counter circuit 14 as input signal therefor (see the wave form (a) in FIG. 7).

The counter circuit 14 consecutively count up the number of the input pulses and the digital code output thereof is given to the D/A convertor 15 as input therefor.

In the illustrated instance it is supposed that the D/A convertor 15 gives as its analog output, in response to the digital code input, chronologically consecutively lowering stepwise DC voltage as the pulse-counting goes on.

The stepwise output voltage is then amplified by the buffer amplifier 16, and the amplified stepwise voltage is given to the recording bias oscilator 6 as input therefor.

The recording bias oscilator 6 is here supposed to give as its output the recording bias current of the amplitude proportional to the input stepwise voltage, thus of the amplitude consecutively lowering stepwise as time (more directly the pulse-counting) goes on (see the current amplitude wave form (b) in FIG. 7).

On the other hand, the component lower and higher frequency calibration signals are mixed together by the mixer circuit 4, to make up a composite calibration signal which passes through the recording-input-signal selection circuit 25 and the recording amplifier 5 to then be incorporated with the recording bias current and to ultimately be recorded by the recorder head 7 on to the running tape 8.

The composite calibration signal recorded on the running tape 8 is then immediately reproduced by the reproducer head 9, and the reproduced composite calibration signal passes through the reproducing equalizer circuit 10 and the reproducing amplifier 11 and is then supplied to the parallelly interconnected pair of the high pass filter 17 and the low pass filter 19, as input for both of them.

The composite calibration signal is then separated by the pair of filters 17, 19 into the component higher and lower frequency signals which are then rectified by the pertaining rectifieers 18, 20, respectively.

Accordingly, the reproduced higher and lower frequency component calibration signals show chronologically the rectified voltage variation patterns in the illustrated instance as seen in FIG. 7 as wave form (c), in solid and dotted lines, respectively.

The two rectified DC voltages are compared with each other by the voltage comparator circuit 22, and output voltage of this voltage comparator circuit 22 is here supposed to show chronologically the shifting pattern as seen in FIG. 7 as wave form (d), thus skipping from the initial low level "0" thereof to the high level "1", upon reaching the stage during the successive stepping variations where the rectified DC voltage derived from the reproduced higher frequency component calibration signal has just substantially exceeded the counterpart rectified DC voltage derived from the reproduced lower frequency component calibration signal, thus upon reversing the initial state up to that stage.

The output of the comparator circuit 22, now skipped to the high level "1", is given to the RS flip-flop circuit 23 and thus causes output F thereof accordingly to skip down from initial high level "1" to low level "0" (see wave form (e) in FIG. 7) and so output F̄ thereof to skip up from initial low level "0" to high level "1" (see wave form (f) in FIG. 7).

The output F thusly skipped down to low level "0" causes the AND-gate 13 to stop passing the pulses to be inputed to the counter circuit 14 which is thus made to hold the pulse number consecutively counted up to that time.

In this way, it is stopped altering any further the recording bias current intensity at this point of time, namely when the reproduced output sound levels of the said two component calibration signals have become to be recognized as practically identical with each other, and the bias current intensity at that point of time, which is thus substantially the optimal recording bias current intensity, is held thereafter unchanged.

On the other hand, output F̄ of the flip-flop circuit 23, skipped up at this stage from the initial low level "0" to the high level "1" as already described, causes here to shift the recording-input-selection circuit 25 to interrupt the initial conduction to calibration-terminal contact C and to make up conduction to sound-signal-line-terminal contact L (see wave form (g) in FIG. 7). Preparation has thus been all set to start recording the signal line input sound under the said optimal recording bias current intensity.

As the fundamental basis for starting the function as described above, a starting pulse is generated in operative connection with the manual pushing of the recording button of the tape-recorder and is given to the starting-pulse-input terminal 24 (see wave form (h) in FIG. 7) at the very start, in order thereby to restore the entire system to its proper starting state, thus to reset the flip-flop circuit 23 in its initial state of the output F in high level "1" and so the output F̄ in low level "0" and also to reset the counter circuit 14 in its initial state of pulse count number "zero".

Further shown in FIG. 6, as inserted in the illustrated instance in the line from output terminal of the rectifier circuit 20 for the component lower frequency calibration signal to the pertinent input terminal of the voltage comparator circuit 22, is a DC-shifter circuit 21 which is designed to function for eliminating malfunction as might otherwise be feared for instance as accidental skipping over of the output of the comparator circuit 22 to the high level "1" under influence of weak drifting noise, without true actuation signaling, and which gives for this purpose a permanent DC-shifting bias voltage in proper degree so that the output of the comparator circuit 22 may surely be retained undisturbedly in the low level "0" when no true actuation signaling.

The DC-shifting bias voltage must be only quite a small fraction of the said rectified DC output voltage itself of the reproduced component lower frequency calibration signal through the rectifier circuit 20, but it must on the other hand be larger than the possible drifting noise voltage, and it is normally proper to set it somewhere around 10 mV.

Though it is illustrated and described to chronologically alter the recording bias current intensity in stepwise manner consectively lowering from step to step and accordingly to stop altering the recording bias current intensity upon finding that the reproduced output sound level of the component higher frequency signal has just become substantially higher than that of the component lower frequency signal, it is also possible to entirely reverse the system, thus to chronologically alter the recording bias current intensity in stepwise manner consecutively raising from step to step and accordingly to stop altering the recording bias current intensity upon finding that the reproduced output sound level of the component higher frequency signal has just become substantially lower than that of the component lower frequency signal.

Instead of such quantized stepwise alteration of the recording bias current intensity and accordingly utilizing the digital processing circuitry, it is as well possible to continuously smoothly alter the recording bias current intensity by means for instance of servomotor, variable resistor and so forth and to stop altering the recording bias current intensity upon finding that the reproduced output sound levels of the component lower and higher frequency calibration signals have just become substantially identical with each other. Compared with the method based upon the quantized stepwise alteration, this method has the advantage in that more precise adjustment of the optimal recording bias current intensity is hereby made possible, though it has on the other hand the disadvantage in that the apparatus required for performing this method must somewhat be more expensive.

I claim:

1. A method of automatically establishing proper adjustment of biasing current for recording sound with a three-head type tape-recorder which is equipped with a recorder head and a reproducer head as well as an eraser head, one separate from and independent of another, so that recording sound by the recorder head on a running magnetic tape and immediately reproducing the recorded sound by the reproducer head immediately downstream of the recorder head in the sense of the tape-running may be made, the method comprising the steps of:

generating composite calibration signal by mixing a lower frequency signal and a higher frequency signal, having sound level identical with each other, recording the composite cabilbration signal while chronologically consecutively altering intensity of biasing current for the recording, immediately reproducing the recorded composite calibration signal on the running tape, filtering off the reproduced composite calibration signal to obtain the component lower and higher frequency signal outputs, comparing output sound levels of the filtered lower and higher frequency signals with each other, and stopping any further altering the recording bias current intensity upon finding, as a result of the comparing, that the output sound levels of the filtered lower and higher frequency signals have become substantially identical with each other or that the output sound level difference has just been substantially reversed, namely that the output sound level of the one component signal, initially having lower output sound level than the other, has just become substantially higher than that of the other.

2. The method of claim 1 wherein the chronological consecutive alterations of the recording bias current intensity are performed in consecutive stepwise manner.

3. The method of claim 2 wherein the consecutive stepwise alterations of the recording bias current intensity are performed in a manner of lowering the intensity step after step and the stopping of such stepwise lowering of the recording bias current intensity is caused upon finding that the reproduced output sound level of the higher frequency signal has just become substantially higher than that of the lower frequency signal.

4. In a three-head type tape-recorder equipped with a recorder head (7) and a reproducer head (9) as well as an eraser head, one separate from and independent of another, so that recording sound by the recorder head (7) on a running magnetic tape (8) and immediately reproducing the recorded sound by the reproducer head (9) immediately downstream of the recorder head (7) in the sense of the tape-running may be made, AN APPARATUS for automatically establishing proper adjustment of biasing current for recording sound, comprising:

a pule generator (12) adapted to generate successive pulses during the running of the magnetic tape (8), a counter circuit (14) adapted to consecutively count up number of the pulses, a D/A convertor (15) adapted to receive as input therefor the pulse number digital output and to give as output thereof stepwise voltage with the consecutive stepwise output voltage variations in response to the consecutive counting up of the pulses, a buffer amplifier (16) adapted to amplify the stepwise voltage, a bias generator (6) adapted to receive as input therefor the amplified stepwise voltage and to give as output thereof the recording bias current of the intensity chronologically consecutively altered stepwise responsive to the amplified stepwise input voltage, a mixer circuit (4) adapted to generate composite calibration signal by mixing a lower frequency signal and a higher frequency signal, both of the signals having sound level identical with each other, a parallelly interconnected pair of a high pass filter (17) and a low pass filter (19) adapted to separate, into the component lower and higher frequency signal outputs, the composite calibration signal as reproduced by the reproducer head (9) immediately after being recorded by the recorder head (7) on the running magnetic tape (8), a pair of separate, independent rectifier circuits (18 and 20) adapted to rectify the signal outputs of the filters (17 and 19), respectively, a voltage comparator circuit (22) adapted to receive as input therefor and compare with each other the rectified output voltages of the rectifier circuits (18,20) and to give as output thereof a pulse signal upon finding, as a result of the comparing, that the rectified voltages have become substantially identical with each other or that the rectified voltage difference has just been substantially reversed, namely that the rectified voltage of the output of one filter, initially smaller than that of the other, has just become substantially larger than that of the other, a RS flip-flon circuit (23) with two outputs (F,$\bar{F}$) which are inverse to each other with respect to their high and low level states and which are adapted to be switched as triggerd by the pulse output signal of the voltage comparator (22), an AND-gate (13) adapted to pass forward, as input to the counter circuit (14), and to block up, the successive pulses of the generator (12) depending upon the high and low level states, respectively, of one output (F) of the flip-flop circuit (23), a recording-input-signal selection circuit (25) adapted to be switched between two conduction states, namely to sound signal line terminal contact (L) and to calibration terminal contact (C), depending upon the high and low level states, respectively, of the other output ($\bar{F}$) of the flip-flop circuit (23), and a starting-pulse-input terminal (24) adapted to receive, at the beginning of the recording, a starting pulse to reset both the counter circuit (14) and the RS flip-flop circuit (23) to their initial states.

5. The apparatus of claim 4 wherein the D/A convertor (15) is adapted to give as the output thereof chronologically consecutively lowering stepwise voltage and the voltage comparator circuit (22) is adapted to give as the output thereof the pulse signal upon finding that the rectified voltage of the output of the high pass filter (17) has just become substantially larger than that of the low pass filter (19).

6. The apparatus of claim 5 further comprising a DC-shifter circuit (21) in the output line of the rectifier circuit (20) for the low pass filter (19), adapted to give a DC-shifting to the rectified output voltage of the rectifier circuit (20), the DC-shifting being far smaller than the rectified output voltage of the rectifier circuit (20) but larger than possibly foreseeable noise voltage.

* * * * *